N. H. SUREN.
TIME LIMIT DEVICE FOR CHARGING STORAGE BATTERIES.
APPLICATION FILED JULY 22, 1910.
1,208,044.
Patented Dec. 12, 1916.
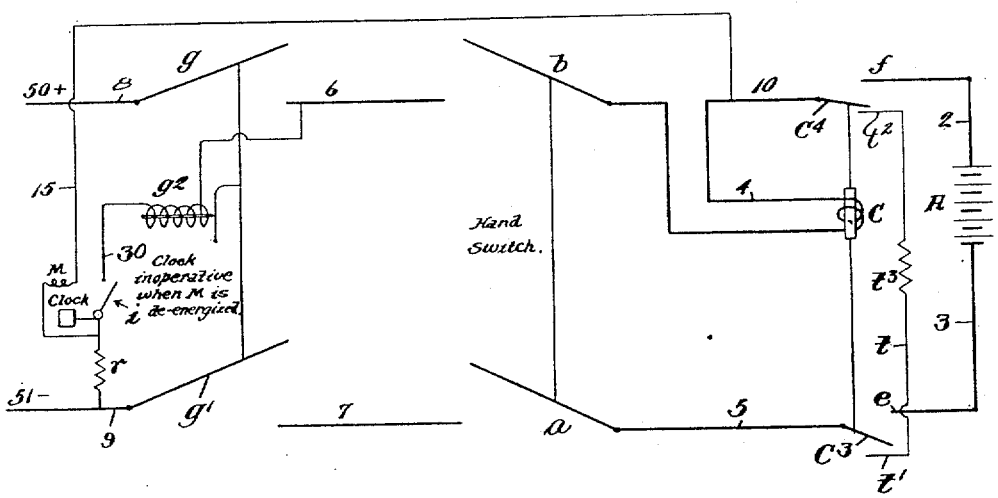
Witness.
H. B. Davis.
Inventor.
Nathan H. Suren
by Amys & Harrison
attys.

UNITED STATES PATENT OFFICE.

NATHAN H. SUREN, OF NEEDHAM, MASSACHUSETTS, ASSIGNOR TO THE GAMEWELL FIRE ALARM TELEGRAPH COMPANY, OF NEW YORK, N. Y., A CORPORATION OF NEW YORK.

TIME-LIMIT DEVICE FOR CHARGING STORAGE BATTERIES.

1,208,044.  Specification of Letters Patent.  Patented Dec. 12, 1916.

Application filed July 22, 1910. Serial No. 573,291.

*To all whom it may concern:*

Be it known that I, NATHAN H. SUREN, of Needham, in the county of Norfolk and State of Massachusetts, have invented an Improvement in Time-Limit Devices for Charging Storage Batteries, of which the following is a specification.

At the present time it is customary to use storage batteries for fire-alarm and police signaling-systems, and such batteries are charged by a current from a charging line. When necessary to charge the storage battery, a switch is operated to connect the storage battery with the charging line, which is subsequently again operated to disconnect the same. In many places it is not convenient for the operator to wait for the storage battery to become charged, or, owing to other duties, he is not present when the battery becomes fully charged; and this invention has for its object to provide an electro-magnetically-operated switch for disconnecting the battery from the charging line, and a time-limit device adapted to be set to operate said switch when the storage battery has been charged for a predetermined period of time.

The invention also has for its object the provision of automatic means for stopping the time-limit device in case the charging current fails, and for starting the same when said current returns, thus temporarily suspending the operation of the time-limit device, thereby providing for the storage battery remaining in connection with the charging line until it has been charged for the full period of time for which the time-limit device is set.

The storage battery may be connected with a suitable switch-board, such, for instance, as shown in patents heretofore granted to me, notably, #668,761, dated Feb. 26, 1901, and the time-limit device embodying this invention is adapted to operate in conjunction with the same.

The figure is a diagram of circuits illustrating my invention.

The storage battery A, is herein shown as adapted to be arranged in connection with a switch-board of any suitable construction, such for instance as shown in my patent aforesaid, and, as here shown, circuit-wires 2, 3, lead from opposite sides of the battery to circuit-closers $e$, $c^3$, and $f$, $c^4$, both controlled by a relay $c$, which latter is included in a circuit-wire 4, leading from one of said circuit-closers to one side, as $b$, of a knife-switch, the other side $a$ of said switch being connected by circuit-wire 5 with the other circuit-closer. The members $c^3$, $c^4$ of the circuit-closers are adapted to be operated by the armature of the relay $c$ and to be moved by said armature into engagement with the members $e$ and $f$ when said armature is moved into its attracted position. When said armature is retracted said members $c^3$ and $c^4$ are moved to disengage the members $e$ and $f$ to thereby open the circuit. The relay $c$ is arranged in the circuit over which the charging current passes hence is under the influence of said current and in case said current fails its armature will be permitted to retract. To provide for automatically attracting the armature when the charging current returns a loop $t$ is provided, which is connected with contact-pens $t'$, $t^2$, which are arranged to be engaged respectively by the circuit closing members $c^3$, $c^4$, when the armature of the relay $c$ is retracted, to thereby connect said loop in the circuit, and said loop includes a resistance $t^3$, sufficient to reduce the strength of the current so as to prevent the relay $c$ from again attracting its armature until the full charging current has returned. The knife-switch $a$, $b$, is designed to be operated manually to connect the storage battery with the charging line. The construction of said switch-board mechanism, however, is not material and said mechanism may be omitted, or in lieu thereof, any other switch-board mechanism may be employed in case some sort of switch-board mechanism is required. A pair of circuit-wires 6, 7, lead respectively from opposite sides $b$, $a$, of said knife-switch to the opposite sides $g$, $g'$, of an electro-magnetically-controlled knife-switch, and a circuit-wire 8 leads from one side, as $g$, of said last-named knife-switch to one side of the charging-circuit at 50, and a circuit-wire, 9, leads from the other side, as $g'$ of said knife-switch to the other side of the charging-circuit at 51.

The knife-switch $g$, $g'$ is designed to be normally open, so that the charging-circuit is disconnected from the storage battery, but, when closed, and the circuit at the switch-board also closed, the current from the charging-circuit will pass through the storage battery for the purpose of charging it.

The electro-magnetically controlled switch $g$, $g'$, when closed, is adapted to be locked in closed position, and to be released by an electro-magnet, which is controlled by the time-limit device, and, as here shown, $g^2$ represents the electro-magnet which is employed to release the switch and permit it to open the circuit.

The electro-magnet $g^2$ is included in a circuit-wire 30 leading from the line wire 6, to the line wire 9. Said circuit-wire 30 includes a circuit-closer $i$, which is controlled by a time-limit device, and when said device is set, said circuit-closer $i$ is opened, but is subsequently closed by said time-limit device, and when closed the electro-magnet $g^2$ will be energized and caused to release the switch $g$, $g'$, permitting it to open and disconnect the storage battery from the charging-circuit. A time-limit device, such as represented in my divisional application, filed May 8, 1916, #96,003 may be employed.

It frequently happens that the charging current is interrupted, and means are provided for causing a corresponding cessation of the time-limit device during such interruption, so that the period of time for charging will not be consumed unnecessarily. In carrying out this feature an electro-magnet $m$ is employed, which controls the running of the time-limit device. Said electro-magnet $m$ also serves to hold said circuit-closing train at rest while the storage battery is not being charged, arresting said train when the switch is opened at the end of the charging operation, therefore, it acts as a controlling magnet for arresting said train whenever it is deënergized, and while energized permitting operation thereof.

The electro-magnet $m$ is included in the circuit-wire 15 leading from the circuit-wire 10 through a resistance $r$ to the circuit-wire 9. Said electro-magnet $m$ is, therefore, arranged in multiple with the storage battery, and when the storage battery is connected with the charging circuit by a closure of the switch $c^4$, $f$ and $c^3$, $e$, the circuit of the electro-magnet $m$ will be closed, and the magnet will become energized and will immediately release the circuit-closing train. In case the charging current is interrupted from any cause, the circuit-closing members $c^3$ and $c^4$ will disengage their co-acting members $e$ and $f$, thereby opening the circuit of the storage battery, and disconnecting said battery from the charging current, and owing to the potential difference across the charging line the armature of said magnet $m$ will retract and act to suspend operation of the time-limit device. As the loop $t$ with resistance $t^3$ is at such time included in the circuit, the circuit will be closed so that when the charging current returns the armature of the relay $c$ will be again attracted and the armature of the magnet $m$ will also be again attracted and the operation of the time-limit device will be permitted to resume. Thus, if the time-limit device is set for, say, four hours, it will operate to control the connection of the storage battery with the charging circuit long enough for the charging-current to flow through the storage battery four hours, regardless of interruptions.

When the charging-current ceases at the end of the charging period, due to the opening of the switch $g$, $g'$, said magnet $m$ will become deënergized and will act to arrest the circuit-closing train and hold it at rest until said switch $g$, $g'$, is again closed to repeat the charging operation, whereupon it will become energized and again release the circuit-closing train. The resistance $r$ is employed particularly to limit the amount of current which passes through the magnets $m$ and $g^2$ to prevent injury thereto.

When the charging-current ceases at the end of the charging operation due to the opening of the switch $g$, $g'$, said magnet $m$ will be deënergized the same as when the charging-current fails and will act to arrest the circuit-closing train and hold it at rest until the switch $g$, $g'$ is again closed to repeat the charging operation, whereupon it becomes energized and again releases the circuit-closing train.

The resistance $r$ is employed particularly to limit the amount of current which passes through the magnets $m$ and $g^2$, to prevent injury thereto, when arranged in series relation therewith, respectively. When the magnet $m$ is arranged in series relation the arrangement of the circuits will be as follows:—circuit-wire 10, binding-post 12, circuit-wire 13, plate 14, circuit-wire 15, magnet $m$, plate 16, circuit-wire 17, plug-switch $h$, circuit-wire 18, plate 19, circuit-wire 20, resistance coil $r$, circuit-wire 21, circuit-wire 9, to charging-circuit at 51. If the voltage of the charging-circuit is, say 110, a small resistance only will be required, but if the voltage is higher then a larger resistance will be required, and herein provision is made for three different voltages, three different resistances being employed, and plug-switches are provided which are arranged to connect the several resistances in circuit. The smallest resistance is included in the circuit between plate 19 and the circuit-wire 9, and additional resistances are included in branch wires leading from said plate 19, and the plug-switches are arranged to connect one or more of the resistances in circuit as may be required. When the circuit-wire 30 including the electro-magnet $g^2$ is closed by the circuit-controllers of the time-limit device, said electro-magnet $g^2$ is arranged in series relation with the resistance, the circuit being as follows:—circuit-wire 30, plate 16, circuit-wire 17, plug-switch $h$, circuit-wire 18, resistance $r$, circuit-wire 21 to circuit-wire 9.

I claim:

1. In a time-limit device for the charging of storage-batteries, the combination of a switch to connect a storage-battery with a charging line, and means responsive to a difference of potential across the charging mains, and operative only while current is charging the battery and arranged to open said switch when the current has charged the battery for a predetermined length of time, substantially as described.

2. In a time-limit device for the charging of storage-batteries, the combination of a switch to connect a storage-battery with a charging line, and switch-opening means responsive to a difference of potential across the charging mains, and arranged to open said switch when the current has charged the battery for a predetermined period of time and also arranged for suspension of operation upon cessation of the charging current during such time, substantially as described.

3. In a time-limit device for the charging of storage-batteries, the combination of a switch to connect a storage battery with a charging line, switch-opening means to open said switch when the current has charged the battery for a predetermined period of time, means responsive to a difference of potential across the charging mains, to cause operation of the switch-opening means while the charging current passes to the battery and to engage and hold said switch-opening means at rest while not influenced by the charging current, substantially as described.

4. In a time-limit device for the charging of storage-batteries, the combination of a switch to connect a storage battery with a charging line, switch-opening means associated therewith to open the switch when the current has charged the battery for a predetermined period of time, a controlling-magnet for said switch-opening means which is responsive to a difference of potential across the charging mains, and arranged while deënergized to arrest the switch-opening means and while energized to permit operation thereof, substantially as described.

5. In a time-limit device for charging storage batteries, the combination of a switch having means for operating it manually to connect a storage battery with a charging line, automatic means to open it at the end of a period of time, and means responsive to a potential difference across the charging line, to temporarily suspend operation of said automatic means during the time said charging current fails, substantially as described.

6. In a time-limit device for charging storage batteries, the combination of a switch having means for operating it manually to connect a storage battery with a charging line, automatic means for opening it including an electro-magnet, a circuit-closing train to control the circuit of said electro-magnet, and a controlling-magnet for said train responsive to a potential difference across the charging line, whereby said train is stopped when the charging current fails, and is subsequently released when the charging current returns, substantially as described.

7. In a time-limit device for charging storage batteries, the combination of a switch having means for operating it manually to connect a storage battery with a charging line, automatic means for opening it including an electro-magnet, a circuit-closing train to control the circuit of said electro-magnet, and means responsive to a potential difference across the charging line, to control the operation of said train, substantially as described.

8. In a time-limit device for storage batteries, the combination with a switch for connecting a storage battery with a charging line, automatic means for opening it, including an electro-magnet, a circuit-closer for the circuit of said electro-magnet, an actuator therefor, having means for setting it in different positions, operating-means for said actuator, a controlling-magnet for said operating-means, responsive to a potential difference across the charging line, whereby said operating-means is stopped when the charging current fails, and is subsequently released when the charging current returns, substantially as described.

9. In a time-limit device for storage batteries, the combination with a switch for connecting a storage battery with a charging line, automatic means for opening it, including an electro-magnet, a circuit-closer for the circuit of said electro-magnet, an actuator for said circuit-closer, adapted to be set in different positions by hand, a train for operating said actuator, a controlling-train for said operating-train, an electro-magnet responsive to a potential difference across the charging line, and means controlled by it for stopping the operating train when the current fails, and for subsequently releasing it when the current returns, substantially as described.

10. In a time-limit device for storage batteries, the combination with a switch for connecting a storage battery with a charging line, automatic means for opening it, including an electro-magnet, a circuit-closer for the circuit of said electro-magnet, an actuator for said circuit-closer, adapted to be set in different positions by hand, a spring-actuated train for operating said actuator, a clock-train, a releasing-finger on the operating train adapted to engage a member driven by the clock-train and to be repeatedly released as said member revolves, and an electro-magnet responsive to a potential difference across the charging line, having an armature-lever with an extension arranged to enter the path of movement of said releasing-finger when the armature is in retracted position, and said releasing-finger is disconnected from the clock-train, substantially as described.

11. In a time-limit device for the charging of storage-batteries, the combination of a relay associated with the charging-circuit, and means controlled by it to connect and disconnect a storage battery with the charging-circuit, a switch to close the charging-circuit, time-controlled switch-opening means, a controlling-magnet for said switch-opening means controlled by the charging circuit while the charging-circuit is connected with the storage battery, said controlling-magnet while energized permitting operation of the switch-opening means and while deënergized arresting said switch-opening means, substantially as described.

12. The combination with a storage-battery and charging circuit therefor, a relay in said circuit, means operated by said relay for connecting the storage battery with and disconnecting it from the circuit, a switch to connect the storage battery with the charging line and time-controlled switch-opening means controlled by the charging circuit and operative only during the passage of the charging current to the battery for opening said switch when the current has charged the battery for a predetermined length of time, substantially as described.

13. The combination with a storage battery, a charging-circuit therefor, a relay in said circuit, means operated by said relay for connecting the storage battery with and disconnecting it from the charging-circuit, of a switch normally biased to open position and arranged for manual operation to close the charging-circuit, automatic means for opening it including an electro-magnet, a circuit-closing train for the circuit of said electro-magnet, and a controlling-magnet for said train which is controlled by the charging circuit, substantially as described.

14. The combination with a storage-battery, a charging-circuit therefor, a relay in said circuit, means operated by said relay for connecting the storage battery with and disconnecting it from the charging-circuit, of a switch normally biased to open position and arranged for manual operation to close the charging-circuit, automatic means for opening it including an electro-magnet, a circuit-closing train for the circuit of said electro-magnet, a controlling-magnet for said train which is controlled by the charging circuit, whereby said train is suspended and the storage battery disconnected from the charging-circuit with its coils included in said circuit, upon cessation of the charging current, and means controlled by said relay to close the charging-circuit when the storage-battery is disconnected therefrom, substantially as described.

15. The combination of a storage-battery, a charging-circuit therefor, a relay associated therewith, a switch for closing the charging-circuit to include said relay therein, means operated by said relay for connecting the storage-battery with and disconnecting it from the charging-circuit, another switch normally biased to open position and arranged for manual operation to close said charging-circuit, automatic means for opening said last named switch including an electro-magnet, a circuit-closing train for the circuit of said electro-magnet, and a controlling-magnet for said train which is controlled by the charging circuit, substantially as described.

16. The combination of a storage battery, a charging-circuit therefor, a relay in said circuit, means operated by said relay for connecting the storage-battery with and disconnecting it from the charging-circuit, a switch normally biased to open position and arranged for manual operation to close the charging-circuit, automatic means to open said switch including an electro-magnet, a circuit-closing train for the circuit of said electro-magnet, a controlling-magnet for said circuit closing-train, controlled by the charging-current, a resistance, and means controlled by said relay for connecting said resistance in series relation with said controlling-magnet, substantially as described.

17. The combination with a storage-battery, a charging-circuit therefor, a relay in said circuit, means operated by said relay for connecting the storage battery with and disconnecting it from the charging-circuit, of a switch normally biased to open position and arranged for manual operation to close the charging-circuit, automatic means for opening it including an electro-magnet, a circuit-closing train for the circuit of said electro-magnet, a controlling-magnet for said train which is controlled by the charging circuit, whereby said train is suspended and the storage battery is disconnected from the charging-circuit, a resistance, and means controlled by said relay for connecting said resistance in series relation with said electro-magnet, substantially as described.

18. In a time-limit device for storage batteries, the combination with a storage battery, a switch for connecting it with a charging line, a resistance, and means for connecting said resistance in multiple with said storage battery, automatic means for opening said switch, including an electro-magnet arranged in series with the resistance, a circuit-closer for the circuit of said electro-magnet, an actuator for said circuit-closer adapted to be set in different positions by hand, a restoring-means for said actuator, and an electro-magnet arranged to be operated by the voltage across the charging-circuit for controlling the operation of said restoring means, substantially as described.

19. The combination with a storage-battery and charging circuit therefor, a relay in said circuit, means operated by said relay for connecting the storage-battery with and disconnecting it from the circuit, of a switch for connecting the storage-battery with the charging-circuit, automatic means for opening it including an electro-magnet, a circuit-closer for the circuit of said electro-magnet and actuator therefor having means for setting it in different positions, operating-means for said actuator, a controlling-magnet for said operating-means arranged to be operated by the voltage across the charging-circuit, whereby said operating-means is stopped when the charging-current fails and is subsequently released when the charging-current returns, substantially as described.

In testimony whereof, I have signed my name to this specification, in the presence of two subscribing witnesses.

NATHAN H. SUREN.

Witnesses:
H. B. DAVIS,
B. J. NOYES.

Copies of this patent may be obtained for five cents each, by addressing the "Commissioner of Patents, Washington, D. C."